United States Patent [19]

Zackay et al.

[11] Patent Number: 4,521,530

[45] Date of Patent: Jun. 4, 1985

[54] CATALYST OF PALLADIUM, COPPER AND NICKEL ON A SUBSTRATE

[75] Inventors: Victor F. Zackay, New Canaan, Conn.; Donald R. Rowe, Bowling Green, Ky.

[73] Assignee: Teledyne Industries, Inc., Teledyne Water Pik, Fort Collins, Colo.

[21] Appl. No.: 504,517

[22] Filed: Jun. 15, 1983

[51] Int. Cl.$^3$ .................... B01J 23/72; B01J 23/89
[52] U.S. Cl. ................................. 502/218; 502/60; 502/184; 502/244; 502/326; 502/327; 423/247
[58] Field of Search .............. 502/184, 244, 326, 327, 502/60, 331, 218; 420/456, 587; 423/213.5, 247

[56] References Cited

U.S. PATENT DOCUMENTS 3,085,320  4/1963  Rhys .................................. 420/587
3,849,336  11/1974  Lloyd et al. ........................ 502/165

FOREIGN PATENT DOCUMENTS 53-19478  6/1978  Japan ................................. 502/327

Primary Examiner—W. J. Shine
Attorney, Agent, or Firm—Ralph F. Crandell

[57] ABSTRACT

An oxidation catalyst of palladium, copper and nickel on an alumina substrate. The catalyst is produced by impregnating the alumina substrate with a halide salt solution of palladium chloride, nickel chloride, copper chloride and copper sulfate. The catalyst is useful for removal by oxidation, adsorption or decomposition of gases such as carbon monoxide, hydrogen sulfide, hydrogen cyanide, sulfur dioxide, and ozone, present in dilute concentrations in air.

13 Claims, 2 Drawing Figures

CATALYST OF PALLADIUM, COPPER AND NICKEL ON A SUBSTRATE

FIELD OF THE INVENTION

The present invention relates to an improved oxidation catalyst containing palladium, and more particularly to catalysts of palladium (II) compositions which include copper (II) and a minor proportion of nickel (II). The catalyst is prepared from impregnating solutions containing a palladium (II) salt, copper (II) salt, and nickel (II) salt, preferably in the form of halide salts, notably the chlorides.

BACKGROUND OF THE INVENTION

Oxidation catalysts formed with palladium (II) chloride and copper (II) chloride are well known, having been described in detail in U.S. Pat. No. 3,790,662, issued Feb. 5, 1974, to Larox Research Corporation, on an application filed by William G. Lloyd and Donald R. Rowe, for "Palladium Compositions Suitable as Oxidation Catalyst," and in a division thereof, U.S. Pat. No. 3,849,336, issued Nov. 19, 1974. The disclosure of these patents are incorporated herein and made a part hereof by this reference.

OBJECTS AND SUMMARY OF THE INVENTION

It is the principal object of the present invention to increase and enhance the activity per unit weight of a palladium catalyst and decrease the amount of palladium salt required in the catalyst solution composition.

In accordance with the foregoing objective, an oxidation catalyst of the type described in U.S. Pat. No. 3,790,662 is utilized with the addition of nickel and a corresponding reduction of palladium. For this purpose, nickel chloride is utilized as an added component of the impregnating solution. For ratios of 0.016 moles/liter to 0.064 moles/liter or more palladium and 0.064 moles/liter to 0.016 moles/liter or less nickel in the catalyst impregnation solution composition, and with a total sum of palladium and nickel of 0.080 moles/liter, an increased catalytic activity, measured in terms of the reaction rate constant "k" of the particular catalyst, has been observed. More specifically, the improved catalyst shows an increased activity when compared to the use of palladium (II) salts without the nickel salt additive in the impregnation solution.

DESCRIPTION OF THE PREFERRED EMBODIMENT

Figure 1:
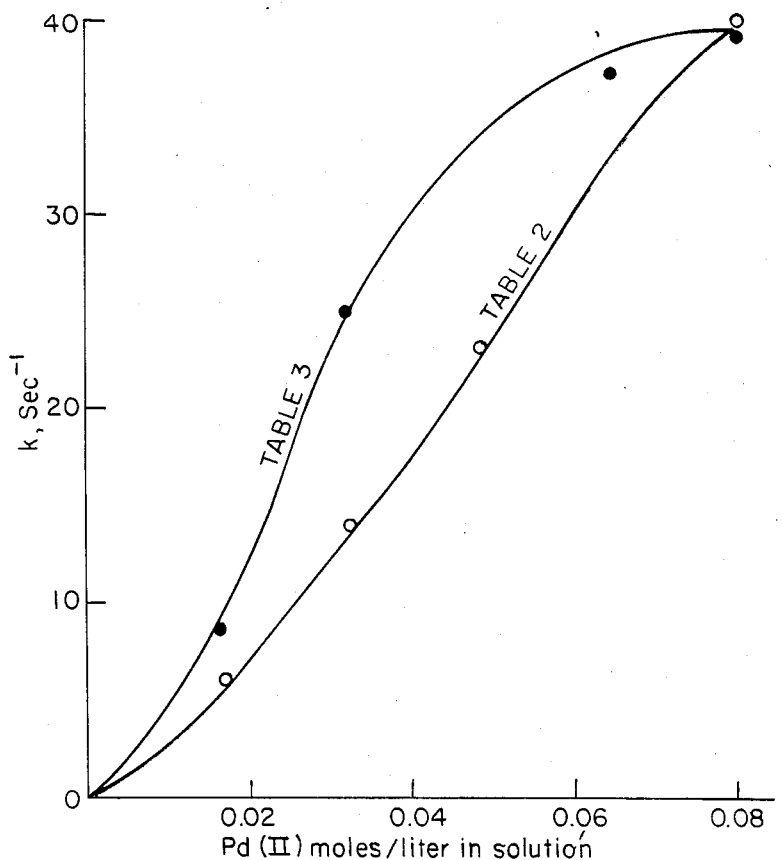
FIG. 1 is a graph plotting $PdCl_2$ concentration, in moles per liter of impregnating solution, versus the pseudo-1st-order rate constant "k", for the removal of carbon monoxide from air at a temperature of about 25° C., and gas flow rate of about 9 cc/sec., using 2 grams of an alumina base catalyst composition, and comparing a standard palladium-copper catalyst with a catalyst embodying the present invention, using data listed in Tables 2 and 3.

Catalysts embodying the present invention are prepared by dissolving the metal salts palladium chloride, copper chloride and nickel chloride in water at about 20° to 25° C. The amount of palladium chloride may run from 0.0005 moles per liter of palladium chloride up to the solubility of the salt, with an observed optimum of about 0.080 moles per liter palladium (II) chloride. While the amount of palladium salt may be reduced from the optimum of 0.080 moles per liter, the activity or reaction rate constant "k" drops. In accordance with the present invention, the activity constant may be retained at a higher level, or prevented from dropping as fast, by the addition of nickel chloride in order to maintain the total concentration of palladium and nickel at about 0.080 moles per liter. The effect of reduced palladium levels on catalytic activity is mitigated by the addition of nickel salts, and has been observed in some instances actually to increase the reaction rate constant of the catalyst composition.

One form of catalyst composition comprises an alumina base supporting a catalytic salt composition embodying the present invention. The catalyst is prepared by soaking activated alumina particles having a size ranging from about 80 mesh to about 325 mesh, in an aqueous solution containing nickel (II) chloride, palladium (II) chloride, copper (II) chloride, and copper (II) sulfate. After thoroughly impregnating or soaking the alumina, the excess solution is removed by filtration. The impregnated alumina is air dried and is then activated by oven treatment at about 200° C.

Because of the insolubility of palladium (II) chloride salts in the absence of copper ions, to prepare the aqueous catalyst impregnating solution, it is convenient to make up two solutions, A and B, and then combine them with added water to make an impregnating solution of the desired concentration. To this end, palladium (II) chloride salts are added to water together with nickel (II) chloride and copper (II) chloride. The mixture (Solution A) is stirred at room temperature, about 25° C., for a period of time sufficient to dissolve the palladium salt completely. Palladium chloride is essentially insoluble in water but becomes readily soluble in the presence of cupric chloride salts. Copper (II) chloride, or cupric chloride, itself is readily soluble and has a strong solubilizing effect upon the palladium salt.

The second solution (Solution B) is prepared by adding copper II sulfate to water and the mixture is warmed to 60°-70° C. with occasional stirring until the salt is fully dissolved. The solution is then allowed to cool to room temperature. The two solutions, A and B, at room temperature, are mixed and additional water is added to make up a solution of the desired volume and concentration.

To prepare a catalyst batch, alumina particles of about 80 to about 350 mesh, are placed in a beaker or other suitable vessel, and covered with the above described impregnating solution. The alumina is stirred gently to ensure that all particles are fully wetted, and to ensure that no air bubbles are entrained with the alumina. The top of the vessel is covered to avoid contamination and to reduce evaporation, and the mixture is allowed to stand for a period of time sufficient to ensure that the alumina is thoroughly soaked. The impregnated alumina is separated from the raffinate by vacuum filtration.

The wet impregnated alumina is allowed to air-dry. When the impregnated alumina is completely air-dried, it is placed in a furnace at 200° C., and held at this temperature for two to three hours. The finished, activated, catalyst is then allowed to cool, and is then ready to store or be put to use.

The effectiveness of a catalytic composition is conveniently determined by measuring its effect on the removal of carbon monoxide from air. In a test run, typically 2 to 3 grams of catalyst are contacted with a known premixed gas consisting of about 103-105 ppm carbon monoxide in air. Gas and catalyst contact time is in the order of 0.1 to 0.2 seconds. Before and after each run the gas flow rate is determined using an average of triplicate measurements. A pseudo-1st-order rate constant "k" is calculated by determining the rate of oxidation from measurements of the concentrations of carbon monoxide before and after contact with the catalyst. In a typical 60 minute run, measurements are made every 10 seconds. Quadruplicate determinations are taken after 30, 40, 50 and 60 minutes flow of the carbon monoxide containing gas.

Table 1 illustrates the removal of carbon monoxide from air with a standard known palladium-copper catalyst produced by soaking 80 to 325 mesh alumina particles in a solution containing 0.080M/l palladium chloride, 0.30M/l copper chloride, and 0.70M/l copper sulfate.

TABLE 1

Removal of Carbon Monoxide from Air with a Standard PdCl$_2$ Catalyst

| Run | Catalyst charge, g | Contact time milliseconds | Initial CO, ppm | Final Co, ppm | Percent CO removed | k, per sec. |
|---|---|---|---|---|---|---|
| 1 | 2.00 | 135 | 105 | <0.5 | >99.5 | >40. |
| 2 | 3.00 | 200 | 105 | <0.5 | >99.5 | >27. |
| 3 | 2.00 | 185 | 103 | <0.5 | >99.5 | >29. |
| 4 | 2.00 | 153 | 103 | <0.5 | >99.5 | >35. |

Table 2 illustrates the results obtained from a series of catalysts prepared using the above described procedure but with impregnating solutions containing 0.080, 0.064, 0.048, 0.032, 0.016, and 0.000 mole/liter palladium (II) chloride. The table shows the results of a series of 60 minute runs, on the oxidation of carbon monoxide in air by these catalysts.

TABLE 2

Effect of Varying PdCl$_2$ Concentration

| Run | Catalyst charge g | Contact time milliseconds | Initial CO ppm | Final CO ppm | Percent CO removed | k, per sec. | Pd(II) moles/liter |
|---|---|---|---|---|---|---|---|
| 1 | 2.0 | 98 | 105 | 1.6 | 98+ | 40. | .080 |
| 2 | 4.0 | 260 | 105 | 0.5 | 99+ | 20. | .080 |
| 3 | 2.0 | 154 | 105 | 3.0 | 97 | 25. | .064 |
| 4 | 2.6 | 148 | 103 | 6.9 | 93 | 20. | .064 |
| 5 | 4.0 | 333 | 105 | 0.5 | 99+ | 16. | .064 |
| 6 | 2.0 | 138 | 105 | 5.0 | 95 | 23. | .048 |
| 7 | 3.0 | 192 | 103 | 4.3 | 96 | 17. | .048 |
| 8 | 4.0 | 307 | 105 | 1.1 | 99 | 15. | .048 |
| 9 | 2.0 | 118 | 105 | 21.5 | 80 | 14. | .032 |
| 10 | 2.93 | 164 | 103 | 11.8 | 88 | 13. | .032 |
| 11 | 4.0 | 294 | 105 | 1.7 | 98 | 14. | .032 |
| 12 | 2.0 | 123 | 105 | 48. | 54 | 6.1 | .016 |
| 13 | 4.0 | 395 | 105 | 16.3 | 85 | 4.7 | .016 |
| 14 | 2.0 | 112 | 105 | 99. | 6 | 0.5 | .000 |
| 15 | 4.0 | 428 | 105 | 99. | 6 | 0.1 | .000 |

To illustrate the present invention, a series of catalysts was prepared using the same series of decreasing concentrations of palladium chloride in solution as shown in Table 2, but with the addition of nickel chloride to the several impregnating solutions in amounts such that the sum of the concentrations of palladium (II) salts and nickel (II) salts was maintained at 0.080 moles per liter (m/l). The results of a series of 60 minute runs with these catalysts on the oxidation of carbon monoxide are shown in Table 3.

TABLE 3

Effect of Varying PdCl$_2$ Concentration with addition of NiCl$_2$

| Run | Catalyst charge, g | Contact time milliseconds | Initial CO ppm | Final CO ppm | Percent CO removed | k, per sec. | Pd(II) M/l | Ni(II) M/l |
|---|---|---|---|---|---|---|---|---|
| 1 | 2.0 | 138 | 105 | 0.5 | 99+ | 39. | .080 | .000 |
| 2 | 4.0 | 302 | 105 | 0.5 | 99+ | 18. | .080 | .000 |
| 3 | 2.0 | 144 | 105 | 0.5 | 99+ | 37. | .064 | .016 |
| 4 | 2.39 | 124 | 103 | 3.8 | 96 | 29. | .064 | .016 |
| 5 | 4.0 | 187 | 105 | 0.9 | 99 | 26. | .064 | .016 |
| 6 | 2.0 | 134 | 105 | 0.6 | 99+ | 39. | .048 | .032 |
| 7 | 2.47 | 170 | 103 | 7.2 | 93 | 18. | .048 | .032 |
| 8 | 4.0 | 247 | 105 | 0.7 | 99+ | 20.* | .048 | .032 |
| 9 | 2.0 | 127 | 105 | 5. | 95 | 25. | .032 | .048 |
| 10 | 2.91 | 300 | 103 | 2.8 | 97 | 12. | .032 | .048 |
| 11 | 4.0 | 256 | 105 | 1.3 | 98+ | 18.* | .032 | .048 |
| 12 | 2.0 | 148 | 105 | 31. | 70 | 8.8 | .016 | .064 |
| 13 | 4.0 | 298 | 105 | 15. | 86 | 6.9* | .016 | .064 |
| 14 | 2.0 | 156 | 105 | 97. | 8 | 0.5 | .000 | .080 |
| 15 | 4.0 | 208 | 105 | 96. | 8 | 0.4* | .000 | .080 |

*Run with 105 ppm CO in 5% oxygen - 95% nitrogen mixture.

Figure 2:
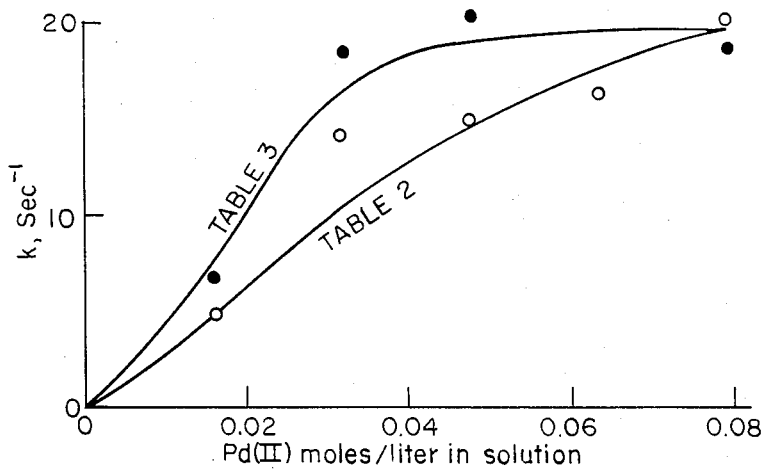
FIG. 2 is a graph plotting $PdCl_2$ concentration, in moles per liter of impregnating solution, versus the pseudo-1st-order rate constant "k" for the removal of carbon monoxide from air at a temperature of about 25° C., and a gas flow rate of about 9 cc/sec., using 4 grams of an alumina base catalyst composition, and comparing a standard palladium-copper catalyst with a catalyst embodying the present invention, using data listed in Tables 2 and 3.

The data from Tables 2 and 3, for 2.0 and 4.0 gram catalyst charges are plotted in FIGS. 1 and 2 respectively. It can be observed from these data and figures that the addition of nickel (II) in combination with palladium (II) increases the catalytic activity as compared to the use of palladium (II) alone. It can be further observed that nickel (II) chloride in the impregnation solution itself affords no catalytic activity in the absence of palladium. The enhanced catalytic activity of the palladium and nickel catalyst composition appears to reside principally in the range of about 0.02M/l palladium and 0.06M/l nickel up to about 0.07M/l palladium and 0.01M/l nickel, in the impregnating solution, although some increase in activity would be expected outside of that range. Some increase in effect is noted with a palladium concentration as low as 0.01 moles per liter and a nickel concentration as high as of 0.07 moles per liter, or a palladium concentration as high as 0.075 moles per liter and a nickel concentration as low as 0.005 moles per liter in the impregnating solution.

Other palladium (II) salts may be used such as palladium bromides, nitrates, or sulfates, or the complex chloride salt $Li_2PdCl_4$. Alternative particulate substrates may include silica gel, charcoal or molecular sieves.

While certain illustrative catalyst solution compositions have been described above in considerable detail, it should be understood that there is no intention to limit the invention to the specific compositions disclosed. On the contrary, the invention includes alternative compositions and uses falling within the spirit and scope of the invention as expressed in the appended claims.

We claim:

1. An oxidation catalyst consisting essentially of palladium, nickel, and copper on a substrate.

2. An oxidation catalyst as defined in claim 1 produced from a solution containing palladium (II) chloride.

3. An oxidation catalyst as defined in claim 1 produced from a solution containing nickel (II) chloride.

4. An oxidation catalyst as defined in claim 1 produced from a solution containing mixture of copper (II) chloride and copper (II) sulfate.

5. An oxidation catalyst as defined in claim 1 produced from a solution containing a palladium (II) salt selected from the group consisting of a chloride, bromide, nitrate, sulfate, and $Li_2PdCl_4$.

6. An oxidation catalyst as defined in claim 1 wherein said substrate is selected from the group consisting of alumina, silica gel, charcoal or a molecular sieve.

7. An oxidation catalyst as defined in claim 1 wherein the substrate is alumina and the catalyst is produced by soaking alumina particles in an impregnating solution containing between about 0.010 and about 0.075 moles/l $PdCl_2$, between about 0.005 and about 0.970 moles/l $NiCl_2$, about 0.300 moles/l $CuCl_2.2H_2O$ and about 0.700 moles/l $CuSO_4.5H_2O$, separating said impregnated alumina particles from the remaining impregnating solution, air drying the impregnated particles, and heating said particles at a temperature and for a period of time sufficient to activate the same for use as a catalyst.

8. An oxidation catalyst as defined in claim 1 wherein the substrate is alumina and the catalyst is produced by soaking alumina particles in an impregnating solution containing between about 0.030 and about 0.060 moles/l $PdCl_2$, between about 0.050 and about 0.020 moles/l $NiCl_2$, about 0.300 moles/l $CuCl_2.2H_2O$ and about 0.700 moles/l $CuSO_4.5H_2O$, separating said impregnated alumina particles from the remaining impregnating solution, air drying the impregnated particles, and heating said particles at a temperature and for a period of time sufficient to activate the same for use as a catalyst.

9. An oxidation catalyst as defined in claim 1 wherein the substrate is alumina and the catalyst is produced by soaking alumina particles in an impregnating solution containing about 0.048 moles/l $PdCl_2$, about 0.032 moles/l $NiCl_2$, about 0.300 moles/l $CuCl_2.2H_2O$, and about 0.700 moles/l $CuSO_4.5H_2O$, separating said impregnated alumina particles from the remaining impregnating solution, air drying the impregnated particles, and heating said particles at a temperature and for a period of time sufficient to activate the same for use as a catalyst.

10. An oxidation catalyst consisting essentially of palladium, nickel and copper on an alumina substrate.

11. An oxidation catalyst as defined in claim 10 wherein said palladium and said nickel are in the molar ratio of about 6 to 2 to about 3 to 5.

12. An oxidation catalyst impregnating solution comprising palladium (II) chloride, nickel (II) chloride, copper (II) chloride and copper (II) sulfate, wherein the molar ratio of palladium (II) chloride to nickel (II) chloride is in the range of about 7 to 1 to about 1 to 7, and the molar ratio of the combined total moles of palladium chloride and nickel chloride to the combined total moles of copper salts is about 0.080 to 1, said solution being adapted for impregnating a particulate substrate to form, upon drying and activation, an oxidation catalyst.

13. An oxidation catalyst solution as defined in claim 12 wherein the molar ratio of $PdCl_2$ to $NiCl_2$ is at least about 2 to 6.

* * * * *